Patented Nov. 2, 1937

2,097,734

UNITED STATES PATENT OFFICE 2,097,734

PIGMENT AZO DYESTUFFS

August Modersohn, Cologne-Mulheim, and Werner Schleifenbaum, Leverkusen-I. G.-Werk, Germany, assignors to General Aniline Works, Inc., New York, N. Y., a corporation of Delaware No Drawing. Application March 11, 1935, Serial No. 10,580. In Germany March 17, 1934

4 Claims. (Cl. 260—95)

The present invention relates to new pigment dyestuffs, more particularly it relates to dyestuffs which may be represented by the following general formula:

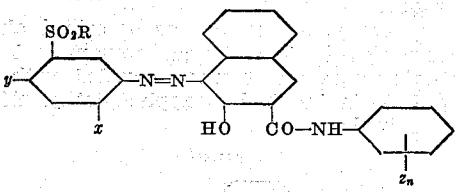

wherein R stands for alkyl, aralkyl or aryl, which radicals may contain non-solubilizing substituents, and $x$ and $y$ stand for hydrogen, alkyl, alkoxy or halogen, or for aralkyl, aryl, aralkoxy or aryloxy, which latter radicals may contain nonsolubilizing substituents in the nucleus, however, $y$ can only stand for the same substituent as $x$, if $x$ stands for hydrogen or alkyl, $z$ stands for alkyl and $n$ stands for a whole number larger than 1, and wherein two $z$'s in o-position to each other may be linked up to form a ring.

Our new dyestuffs are obtainable by coupling in substance or on a substratum of the kind generally used in the manufacture of pigments, such as barium sulfate, the diazo compound of an amine of the general formula:

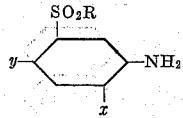

wherein R, $x$ and $y$ mean the same as stated above, with a 2,3-hydroxynaphthoic acid anilide, bearing in the benzene nucleus at least two alkyl groups as substituents.

The new pigment dyestuffs are distinguished by a good fastness to light combined with a good fastness to oil, spirit and solvents.

The invention is illustrated by the following examples, without being limited thereto:

*Example 1.*—475 grams of 2-hydroxynaphthalene-3-carbonylamino-2′,5′-dimethylbenzene are dissolved with 250 ccs. of aqueous concentrated caustic soda lye with the addition of a wetting agent, and the solution thus obtained is made up with water to about 12 litres. Into this solution there is slowly introduced with stirring a diazo solution prepared by diazotizing in the usual manner 395 grams of 3-amino-4-methyldiphenylsulfone. The dyestuff formed having the following formula:

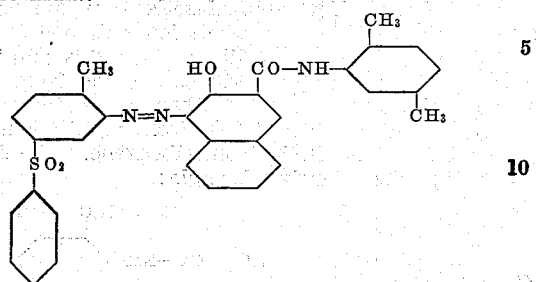

separates in the form of a reddish-orange precipitate. It can be used in the paste or powder form and is distinguished by a very good fastness to oil, spirit and solvents.

By substituting the 2-hydroxynaphthalene-3-carbonylamino-2′,5′-dimethylbenzene by the 2-hydroxynaphthalene-3-carbonylamino-2′,3′-dimethylbenzene or 2-hydroxynaphthalene-3-carbonylamino-2′,4′-dimethylbenzene there are obtained dyestuffs of similar shades and similar fastness properties.

*Example 2.*—110 grams of 2-hydroxynaphthalene-3-carbonylamino-2′,4′-dimethylbenzene are dissolved in the usual manner with the aid of caustic soda lye. The solution is made up with water to 3 litres and after cooling to about 0° C., the naphthol is reprecipitated by hydrochloric acid, while well stirring. After the addition of 100 grams of sodium acetate, into the suspension of the naphthol there is poured a diazo solution prepared in the usual manner from 100 grams of 3-amino-4-methoxyphenylbutylsulfone. The dyestuff having the following formula:

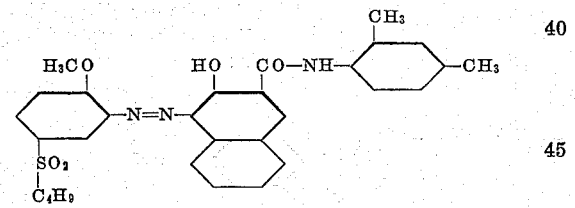

is after drying obtained in form of a dark red pigment suitable for preparing color lakes fast to oil, spirit and solvents.

By substituting the 2-hydroxynaphthalene-3-carbonylamino-2',4'-dimethylbenzene by an equivalent quantity of 2-hydroxynaphthalene-3-carbonylamino-2',3'-dimethylbenzene, there is obtained a pigment of similar shades and having otherwise the same properties.

Example 3.—Into a suspension prepared from 430 grams of 2-hydroxynaphthalene-3-carbonylamino-2',4'-dimethylbenzene according to the directions given in Example 2, there is poured after the addition of 300 grams of sodium acetate a diazo solution prepared in the usual manner from 402 grams of 3-amino-4-methoxyphenylbenzylsulfone. Thus is obtained a clear yellowish-red pigment of the formula:

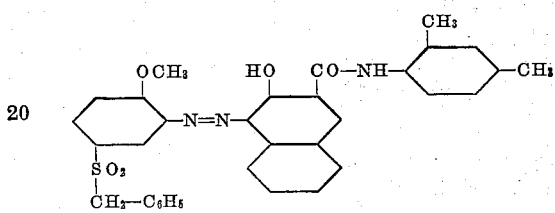

practically insoluble in oil, alcohol and the solvents used in the art of preparing nitrocellulose lacquers.

Example 4.—385 grams of 3-amino-4-methoxydiphenylsulfone are diazotized in the usual manner, and the diazo solution obtained is diluted with water to 10 litres. Into this solution, after the addition of 800 ccs. of glacial acetic acid, there is poured an alkaline reacting solution of 430 grams of 2-hydroxynaphthalene-3-carbonylamino-2',3'-dimethylbenzene. The dyestuff of the following formula:

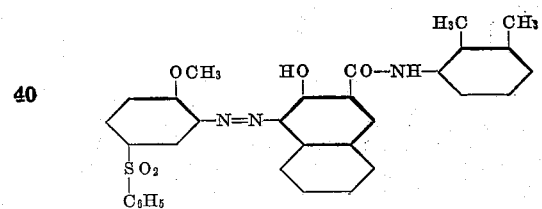

separates in form of a bluish-red precipitate and is suitable for preparing color lakes fast to oil, spirit and solvents.

By substituting the 3-amino-4-methoxydiphenylsulfone by the corresponding quantity of 3-amino-4-methoxy-6-chlorophenylbenzylsulfone and the 2-hydroxynaphthalene-3-carbonylamino-2',3'-dimethylbenzene by 2-hydroxynaphthalene-3-carbonylamino-2',4'-dimethylbenzene, there is obtained a dyestuff of similar properties but more bluish shade.

Example 5.—320 grams of 2-hydroxynaphthalene-3-carbonyl-1'-aminotetrahydronaphthalene are dissolved in 140 ccs. of concentrated aqueous caustic soda lye. After cooling to about 0° C. the naphthol is precipitated by adding hydrochloric acid until weakly acid to Congo. To the suspension thus obtained there is added a diazo solution prepared in the usual manner from 200 grams of 3-amino-4-methyl-phenylethylsulfone and then 500 ccs. of pyridine. The dyestuff having the following formula:

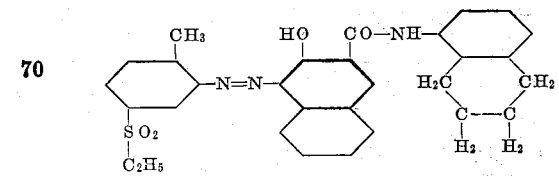

is obtained in form of a red pigment having the good fastness properties of the dyestuffs described in the preceding examples.

Example 6.—305 grams of 2-hydroxynaphthalene-3-carbonylamino-2',4',5'-trimethylbenzene are dissolved in the usual manner with the aid of caustic soda lye. The solution is then diluted with water to 5 litres. After cooling to about 0° C. the naphthol is precipitated by adding hydrochloric acid until weakly acid to Congo while well stirring. To the suspension thus obtained there is added a diazo solution prepared in the usual manner from 277 grams of 3-amino-4-methoxyphenylbenzylsulfone. The reaction mixture is neutralized with aqueous sodium acetate solution, and after this, a solution of 100 grams of sodium acetate free from water in 400 ccs. of water is added. The dyestuff having the following formula:

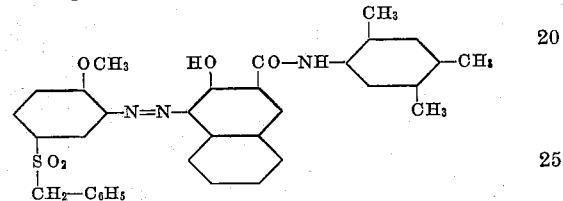

represents after drying a yellowish-red powder suitable for being worked into oil and nitrocellulose lacquers.

In an analogous manner as described above 2-hydroxynaphthalene-3-carbonylamino-2',3'-dimethylbenzene yields when coupled with diazotized 3-amino-4-phenoxyphenylethylsulfone of the formula:

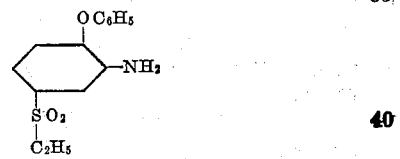

or with diazotized 3-amino-4-benzyloxydiphenylsulfone of the formula:

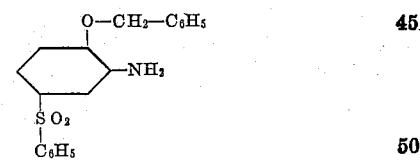

red pigments of good fastness properties.

We claim:
1. Pigment dyestuffs of the general formula:

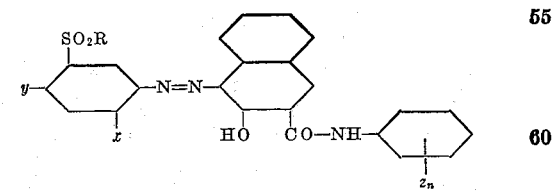

wherein R stands for a member selected from the group consisting of alkyl, aralkyl and aryl, $x$ and $y$ stand for members selected from the group consisting of hydrogen, alkyl, alkoxy, halogen, aralkyl, aryl, aralkoxy and aryloxy in such a manner that $y$ only stands for the same value as $x$, if $x$ stands for hydrogen or alkyl, $z$ stands for a lower alkyl group and $n$ stands for a whole number larger than 1, and such derivatives thereof in which two $z$'s in o-position to each other form a tetramethylene chain, being distinguished by a good fastness to light combined with a good fastness to oil, spirit and solvents.

2. The pigment dyestuff of the following formula:

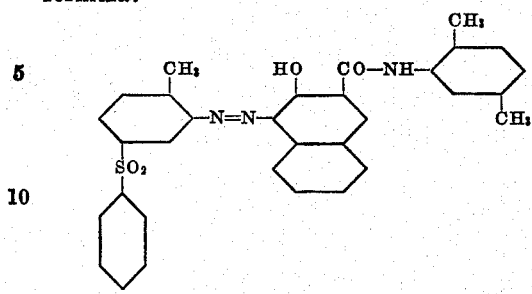

being a reddish-orange substance of a very good fastness to oil, spirit and solvents.

3. The pigment dyestuff of the following formula:

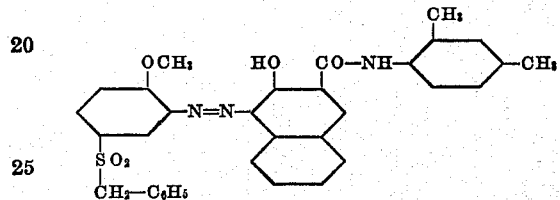

being a yellowish-red substance of a very good fastness to oil, spirit and solvents.

4. The pigment dyestuff of the following formula:

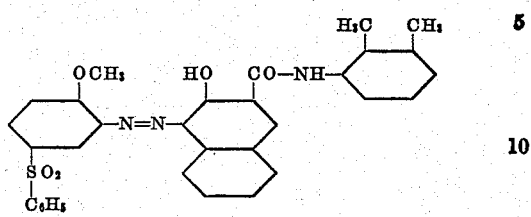

being a bluish-red substance of a very good fastness to oil, spirit and solvents.

AUGUST MODERSOHN.
WERNER SCHLEIFENBAUM.